Patented July 1, 1947

2,423,353

UNITED STATES PATENT OFFICE 2,423,353

POLYMETHYLENE DIGUANAMINES

Jack Theo Thurston, Cos Cob, Conn., assignor to American Cyanamid Company, New York, N. Y., a corporation of Maine No Drawing. Application August 30, 1941, Serial No. 409,149

14 Claims. (Cl. 260—249.5)

This invention relates to polymethylene diguanamines in which the 2-carbon atoms of the 4,6-diamino-1,3,5-triazine rings are linked together through one or more methylene radicals.

The diguanamines of the present invention condense with formaldehyde to form resinous materials which are useful for various purposes such as plasticizers when used either alone or combined with other amino-plastic resins.

Various methods may be used to prepare the diguanamines of the present invention and it is not limited to any particular process. In general, I have found that the diguanamines can be produced by reacting two moles of a biguanide with the esters of dibasic acids. The biguanide and ester groups undergo condensation with the formation of a triazine ring on each end of the molecule. When two molecules or more of biguanide are used for every molecule of the dibasic acid ester, the reaction tends to proceed in the direction of diguanamine formation. However, if insufficient biguanide is present a mixture of the polymethylene diguanamine and the ω-carbalkoxypolymethylene guanamine is obtained. In the case of esters of the lowest members of the straight-chain dibasic acids, such as malonic acid, reaction with biguanide results in almost exclusive formation of the biguanide salt of the carboxy mono-guanamine. In other words, the biguanide has condensed with only one of the two ester groups. All of the factors entering into the reaction have not been conclusively determined and it is not intended to limit the present invention to any theory as to why this reaction of biguanide and dibasic acid esters results in some cases in high yields of the carboxy polymethylene guanamines over the polymethylene diguanamines and in other cases the diguanamine is practically exclusively formed, but I have determined that the tendency toward formation of the mono-carboxy guanamine decreases with increase in the molecular weight of the dibasic acid, and by using an excess of biguanide over that theoretically required. Thus, while the present invention includes broadly diguanamines prepared from any dibasic acid ester, esters of succinic and higher dibasic acids are the most feasible when using the process described above as they yield a high proportion of diguanamines when condensed with a biguanide.

The most important and readily produced products of the present invention are the ones prepared from biguanide itself in which case the amino groups of the triazine rings are unsubstituted. However, the invention also includes diguanamines prepared from substituted biguanides such as phenyl biguanide, allyl biguanide or dimethyl biguanide in which case the correspondingly substituted diguanamines are obtained. When substituted biguanides are used in place of biguanide, the reaction does not proceed as rapidly to completion and it is sometimes desirable to add a condensing agent such as a metal alkoxide to facilitate the reaction. Diguanamines derived from unsubstituted biguanides can usually be prepared without resorting to the use of such condensing agents except where it may be desirable to accelerate the normal reaction.

The biguanide-dibasic acid ester process described above for preparing diguanamines of the present invention operates best in the presence of a suitable solvent for the biguanide and/or ester. I have found that the lower molecular weight alcohols are particularly effective as they are good solvents for biguanide. The cheap monohydric paraffin alcohols such as methanol and ethanol operate well and are of particular advantage because the most readily available dibasic acid esters are usually the methyl and ethyl esters, and if the alcohol which is used as a solvent corresponds to the alcohol radical of the ester, no separation problem arises. Excellent results are, however, obtained with the lower monohydric alcohols such as the ether alcohols, for example the ethyl ether of ethylene glycol.

The invention will be described in greater detail in conjunction with the following specific examples which are typical illustrations. The parts are by weight.

Example 1

Itaconoguanamine

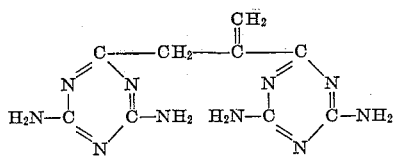

and

Methylene-β-carboxypropionoguanamine

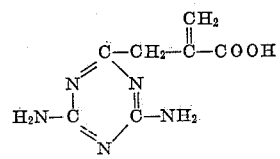

37.2 parts of diethyl itaconate were caused to react with 40 parts of biguanide in about 140 parts of methanol. Within an hour the guanamine began to precipitate and the reaction mixture was allowed to stand overnight. The product was removed by filtration and then extracted with several portions of water, in order to remove the biguanide salt of methylene-β-carboxypropionoguanamine which was recovered in a yield of about 11% from the water solution by acidification to a pH of about 4.0. The yield of itaconoguanamine, which was left from the above water extraction was about 42%.

*Example 2*

Succinoguanamine

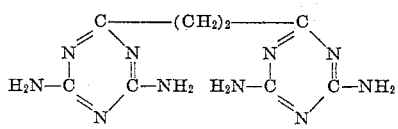

and

β-Carbomethoxypropionoguanamine

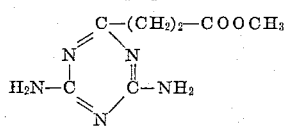

Two hundred and nine parts of ethyl succinate were added to 101 parts of biguanide dissolved in 400 parts of warm methanol. Within a few minutes the product began to precipitate from the solution and after standing overnight the product was filtered and washed with methanol. This material was then extracted with about 300 parts of hot ethanol, which dissolved the β-carbomethoxypropionoguanamine melting at 159° C. The residue left from the alcohol extraction was succinoguanamine melting above 335° C., which could be further purified by dissolving in warm dilute hydrochloric acid solution, followed by precipitation with ammonium hydroxide. When the amount of biguanide was doubled the succinoguanamine was obtained in about 75% yield and the mono-guanamine was absent.

*Example 3*

Glutaroguanamine

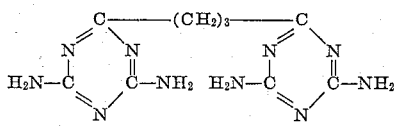

One hundred and seventy-nine parts of ethyl glutarate were added to 202 parts of biguanide dissolved in 1000 parts of methanol. The product began to precipitate from the solution within five minutes, however, the reaction mixture was allowed to stand before filtration. The yield of crude glutaroguanamine having the above formula was about 55% and after purification the yield of product melting above 340° C. was 50%.

*Example 4*

Adipoguanamine

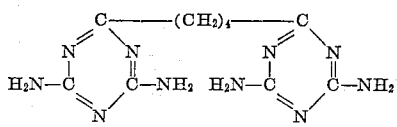

To 40 parts of biguanide dissolved in 160 parts of methanol was added 33 parts of methyl adipate. The guanamine began to precipitate from the solution within a few minutes and appeared complete in about two hours. After filtering and washing with more methanol, the yield of crude product melting at about 290° C. was 80%. A small portion of the product was recrystallized from a large volume of boiling water and the purified adipoguanamine of the above formula melted at 301° C.

*Example 5*

Sebacoguanamine

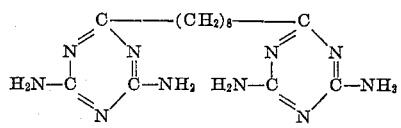

To 40 parts of biguanide dissolved in 160 parts of methanol was added 60 parts of butyl sebacate. After standing about an hour, the reaction mixture was almost solid with product, however, filtration was not undertaken until about 16 hours later. The yield of crude sebacoguanamine melting at 283° C. was 100%. Five parts of this product was dissolved in a hot mixture of 80 parts of ethanol and 30 parts of acetic acid. After cooling and filtering, the acetate salt was suspended in about 600 parts of water and made alkaline to a pH of about 8.4. The insoluble sebacoguanamine was filtered, washed with water and after drying, melted at 308° C.

What I claim is:

1. Diguanamines having the following formula:

in which R is an alkylene radical and G is a guanamine radical having a free valence on the 2-carbon atom of the triazine ring, the bond between G and R in each case being a carbon-to-carbon bond.

2. Diguanamines having the following formula:

in which G is a guanamine radical having a free valence on the 2-carbon atom of the triazine ring and $n$ is an integer greater than 1.

3. Diguanamines having the following formula:

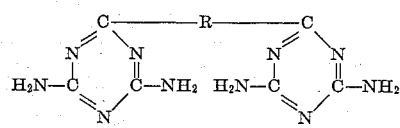

in which R is an alkylene radical.

4. Diguanamines having the following formula:

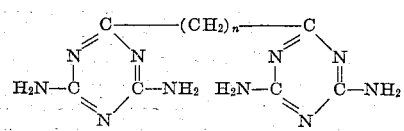

in which $n$ is an integer greater than 1.

5. Glutaroguanamine having the following formula:

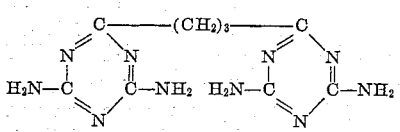

6. Adipoguanamine having the following formula:

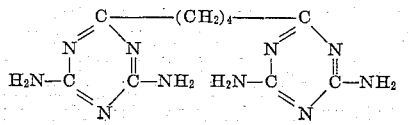

7. Sebacoguanamine having the following formula:

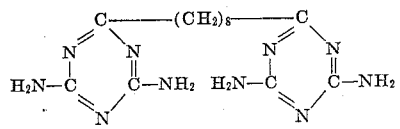

8. A method of preparing diguanamines which comprises admixing a biguanide and a diester of an aliphatic dicarboxylic acid in reactive contact, whereby reaction between the biguanide and diester is instituted and recovering the thus-formed guanamine.

9. A method of preparing diguanamines which comprises admixing a biguanide and a diester of an aliphatic dicarboxylic acid in reactive contact, whereby reaction between the biguanide and diester is instituted, maintaining the residual unreacted reactants in admixture until reaction substantially ceases and recovering the thus-formed guanamine.

10. A method according to claim 9 in which at least two molecular proportions of a biguanide are admixed with each mol proportion of the diester.

11. A method according to claim 9 in which at least two molecular proportions of a biguanide are admixed with each molecular proportion of the diester, the diester having at least two carbon atoms separating the carboxy groups in the acid molecule.

12. A method according to claim 9 in which the biguanide is biguanide.

13. A method according to claim 9 in which the reaction is carried out in solution, the solvent being a lower monohydrate paraffin alcohol.

14. A bis (phenyl triazine) compound of the following formula G—R—G where R is an alkylene radical and G is a member of the group consisting of a mono phenyl substituted guanamine and the tautomeric iso form of a mono phenyl substituted guanamine, the bond between the R and G in each case being a carbon to carbon bond, one of the carbons being part of the triazine ring and the other a carbon of the alkylene radical.

JACK THEO THURSTON.